United States Patent
Komiya et al.

(10) Patent No.: US 9,488,970 B2
(45) Date of Patent: Nov. 8, 2016

(54) SYSTEM CONTROLLER AND PROGRAM

(75) Inventors: Noriyuki Komiya, Tokyo (JP);
Masanori Nakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 560 days.

(21) Appl. No.: 14/112,977

(22) PCT Filed: Apr. 28, 2011

(86) PCT No.: PCT/JP2011/060456
§ 371 (c)(1),
(2), (4) Date: Oct. 21, 2013

(87) PCT Pub. No.: WO2012/147203
PCT Pub. Date: Nov. 1, 2012

(65) Prior Publication Data
US 2014/0039646 A1    Feb. 6, 2014

(51) Int. Cl.
*G06F 3/00* (2006.01)
*G05B 15/02* (2006.01)
*G06F 9/52* (2006.01)

(52) U.S. Cl.
CPC .............. *G05B 15/02* (2013.01); *G06F 9/52* (2013.01)

(58) Field of Classification Search
None
See application file for complete search history.

(56) References Cited

U.S. PATENT DOCUMENTS

| 4,965,719 A | 10/1990 | Shoens et al. |
| 2003/0172210 A1 | 9/2003 | Ogawa et al. |
| 2003/0204682 A1 | 10/2003 | Ueno |

FOREIGN PATENT DOCUMENTS

| JP | 62-145349 A | 6/1987 |
| JP | 01-211140 A | 8/1989 |
| JP | 2001-043121 A | 2/2001 |
| JP | 2003-263405 A | 9/2003 |
| JP | 2003-316753 A | 11/2003 |
| JP | 2009-146051 A | 7/2009 |
| JP | 2009-204185 A | 9/2009 |
| JP | 2010-186241 A | 8/2010 |

OTHER PUBLICATIONS

International Search Report of the International Searching Authority mailed Aug. 9, 2011 for the corresponding international application No. PCT/JP2011/060456 (and English translation).

*Primary Examiner* — Henry Tsai
*Assistant Examiner* — Juanito Borromeo
(74) *Attorney, Agent, or Firm* — Posz Law Group, PLC (57) ABSTRACT

Upon receiving an update registration request for operating state data from a user I/F controller (a device controller), an arbitrator determines whether to permit the update registration request. Upon permission, the arbitrator retains the update registration request for operating state data. If the update registration request is sent by the user I/F controller (the device controller) and the request is permitted by the arbitrator, the user I/F controller (the device controller) generates FIFO registration data, stores the data in a first FIFO buffer (a second FIFO buffer), and saves the data in a display data storage (a device control data storage). If the arbitrator is retaining an update registration request by the other controller, the user I/F controller (the device controller) retrieves the FIFO registration data from the second FIFO buffer (the first FIFO buffer) and saves the data in the display data storage (the device control data storage).

9 Claims, 8 Drawing Sheets

TRANSFER DESTINATION :
SECOND CONTROLLER AND THIRD CONTROLLER

ADDRESS DESIGNATION AREA

FIG.9B

TRANSFER DESTINATION: THIRD CONTROLLER

ADDRESS DESIGNATION AREA

FIG.10A

TRANSFER DESTINATION :
FIRST CONTROLLER AND SECOND CONTROLLER

ADDRESS DESIGNATION AREA

FIG.10B

FIRST CONTROLLER COMPLETES RETRIEVAL
OF FIFO REGISTRATION DATA

ADDRESS DESIGNATION AREA

SYSTEM CONTROLLER AND PROGRAM

CROSS REFERENCE TO RELATED APPLICATION

This application is a U.S. national stage application of Internatinal Application No. PCT/JP2011/060456 filed on Apr. 28, 2011.

TECHNICAL FIELD

The present invention relates to technology that updates and synchronizes across multiple databases.

BACKGROUND ART

In the past, various technologies for synchronizing across multiple databases have been proposed. For example, in the air conditioning system disclosed in Patent Literature 1, in order to synchronize attribute information DBs respectively managed by multiple distributed management devices and a central management device, a signal that includes attribute information data is periodically transmitted among the multiple distributed management devices and the central management device.

CITATION LIST

Patent Literature

Patent Literature 1: Unexamined Japanese Patent Application Kokai Publication No. 2009-204185

SUMMARY OF INVENTION

Technical Problem

Meanwhile, in a typically well-known building facility system, a controller that centrally controls devices such as air conditioners and lighting device (a system controller) is ordinarily equipped with a display controller for displaying the operating state of each device, and a device controller for conducting operational control and the like for each device.

Additionally, in the above case, a DB managed by the display controller (a display control DB) and a DB managed by the device controller (a device control DB) are prepared separately. Since processes relating to the operating state of each device require the display controller side and the device controller side to be consistent, data relating to the operating state in these DBs needs to be updated and synchronized.

Ordinarily, this type of system controller has one CPU on board, and thus the above updating and synchronizing has relied on operating system (OS) functions in the past.

For this reason, a problem has remained in that overhead and deadlocks occur due to OS processes, such as issuing system calls, for example. Consequently, with this type of system controller, circumstances demand the proposal of a new update and synchronization technology that does not rely on OS functions.

The present invention, being devised in light of the above circumstances, takes as an objective to provide a system controller and the like able to update and synchronize across multiple databases with a configuration that does not rely on OS functions.

Solution to Problem

In order to achieve the above objective, a system controller according to the present invention comprises:

first control means that conducts a process related to a user interface;

second control means that exchanges data with each of a plurality of devices;

first data storage means that stores operating state data regarding the operating state of the devices, and is subjected to data reading and writing by the first control means;

second data storage means that stores the operating state data, and is subjected to data reading and writing by the second control means; and arbitration means that, when receiving an update registration request for operating state data from the first control means or the second control means, determines whether to permit or deny update registration for the operating state data according to given conditions, and responds to the request source with a determined result, while also retaining the update registration request for operating state data in the case of permission;

wherein, in the case where the first control means or the second control means issues an update registration request for operating state data and the update registration is permitted by the arbitration means, the first control means or the second control means stores update data indicating updated content for the operating state data in a given buffer, while also updating the content of the operating state data being saved in the corresponding first data storage means or second data storage means on the basis of the update data, and in the case where the arbitration means is retaining an update registration request from the other control means, the first control means or the second control means retrieves update data stored by the other control means from the buffer, and updates the content of the operating state data being saved in the corresponding first data storage means or second data storage means on the basis of the update data.

Advantageous Effects of Invention

The present invention is equipped with arbitration means that determines whether to permit or deny update registration for operating state data in the case where a content change occurs in operating state data during respective processes of first control means and second control means. Thus, in first data storage means and second data storage means managed by the first control means and the second control means, respectively, it is possible to update and synchronize operating state data, and maintain the consistency of the operating state data. Additionally, since the above update synchronization is realized by a configuration that does not rely on OS functions, it becomes possible to avoid overhead and deadlocks occurring due to OS processes, such as issuing system calls, for example. Consequently, higher execution efficiency is anticipated.

DESCRIPTION OF EMBODIMENTS

Hereinafter, a system controller according to embodiments of the present invention will be described in detail with reference to the drawings.

(Embodiment 1)

Figure 1:
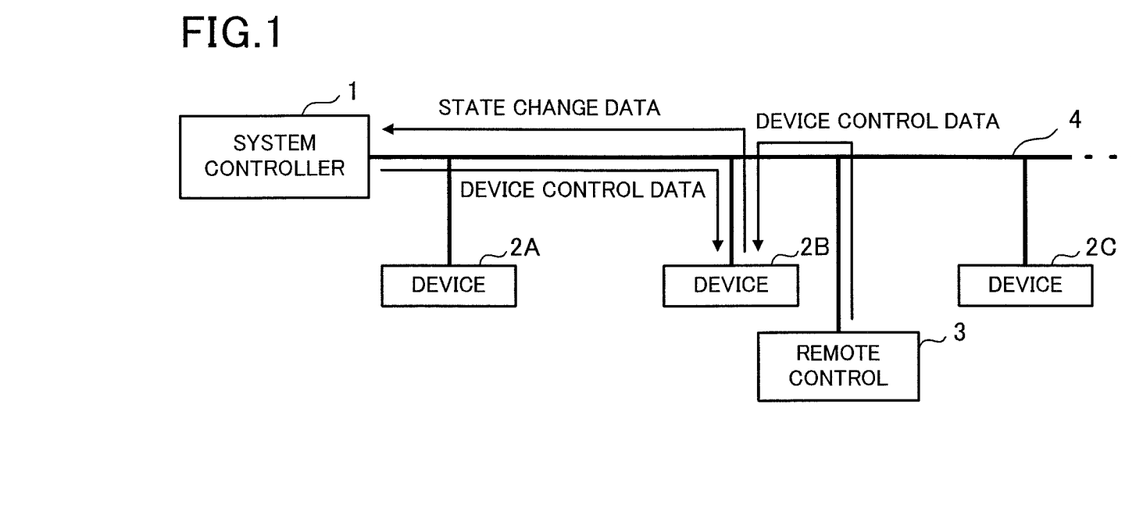
FIG. 1 is a diagram illustrating a configuration of a facility system comprising a system controller according to an embodiment of the present invention.

FIG. 1 is a diagram illustrating an overall configuration of a facility system comprising a system controller 1 according to the present embodiment. The facility system is a system for controlling and managing devices 2 such as air conditioners and lighting device installed in an office building (a building facility system), for example. As illustrated in FIG. 1, in the facility system, a system controller 1, multiple devices 2 (devices 2A, 2B, 2C, . . . ), and one or more remote controls 3 are connected to a facility network 4. The facility network 4 is constructed with established network technology in a typical building facility system.

The remote control 3 is a remote controller that causes respective devices 2 to operate according to user-desired set conditions. The remote control 3 is potentially configured such that one remote control 3 is prepared for each device 2, or configured such that one remote control 3 corresponds to multiple devices 2, as in the current example.

Hardware-wise, the remote control 3 comprises a central processing unit (CPU), read-only memory (ROM), random access memory (RAM), readable/writable non-volatile semiconductor memory such as flash memory, a given user interface, a communication interface for communicating with other devices via the facility network 4, and the like (none illustrated). The user interface comprises a display device such as a liquid crystal display device, an input device such as a keypad, touchpad, touch panel, and/or the like, for example. The remote control 3 receives an input operation from a user via the user interface, and transmits data in accordance with the received input operation (device control data) to a specified device 2.

A device 2 operates on the basis of device control data from the remote control 3. For example, in the case where the device 2 is an air conditioner, the device 2 switches among operating modes such as cool, heat, fan, and dehumidify, operates to blow out air at a set temperature according to a set airflow, and the like, according to device control data from the remote control 3. As another example, in the case where the device 2 is lighting device, the device 2 turns off or turns on, or provides lighting with a modified intensity, color temperature, or the like, according to device control data from the remote control 3.

As discussed above, when the operating state of a device 2 is changed by the remote control 3, the device 2 transmits state change data indicating the changed operating state to the system controller 1.

Hardware-wise, the system controller 1 comprises a CPU, a ROM, a RAM, a hard disk drive or readable/writable non-volatile semiconductor memory such as flash memory, a given user interface, a communication interface for communicating with other devices via the facility network 4, and the like (none illustrated). The user interface comprises an input device (made up of devices such as a keyboard, mouse, keypad, touchpad, touch panel, for example), and a display device (made up of a device such as a CRT or a liquid crystal display device, for example).

Upon receiving the above state change data from a device 2, the system controller 1 stores such state change data as the current operating state of that device 2. The operating state of each device 2 is output displayed in a given format from the above display device according to user operations, for example. The operating state referred to herein includes content such as an operating mode (such as stopped, cool, heat, fan, or dehumidify) and a set temperature and airflow. In addition, the system controller 1 is also able to cause a particular device 2 to operate according to user-desired set conditions in response to user operations performed via the above input device. In other words, in the case where a user operation is an operation related to changing the operation of a device 2, the system controller 1 is able to control the operation of that device 2 by generating device control data and transmitting it to the corresponding device 2 in response to such an operation.

Figure 2:
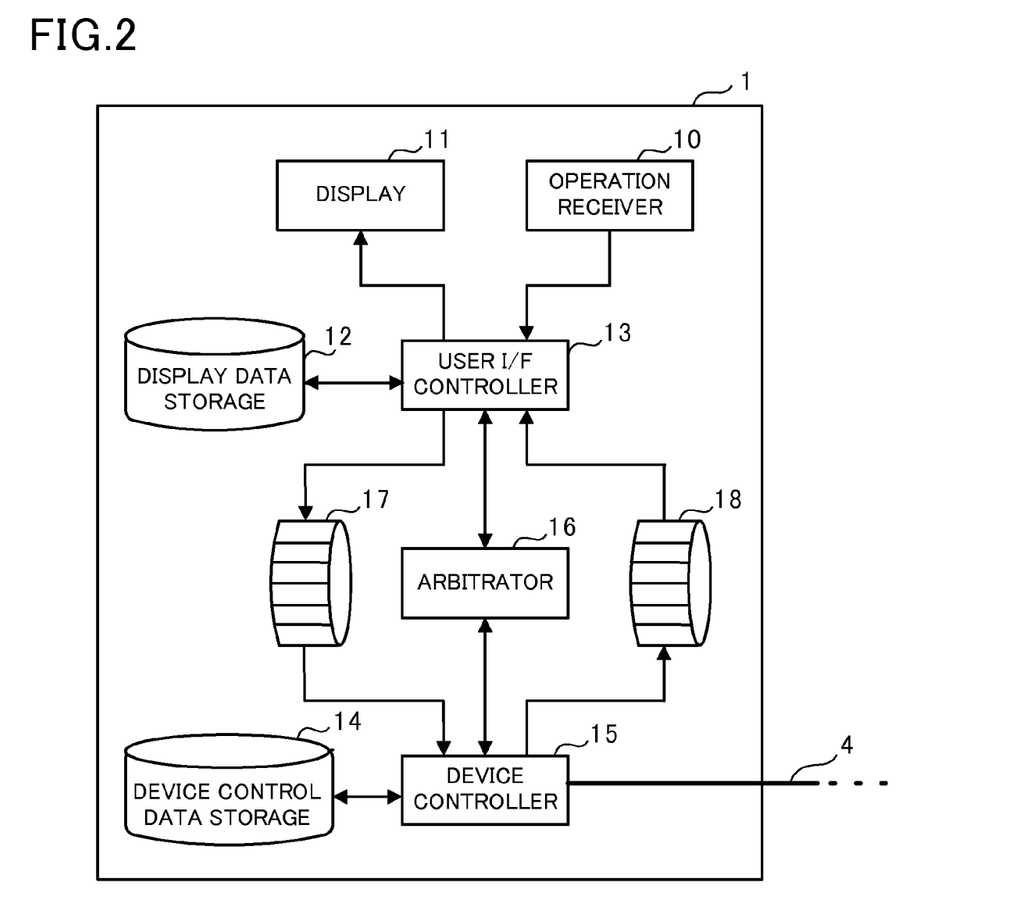
FIG. 2 is a block diagram illustrating a functional configuration of a system controller in Embodiment 1.

FIG. 2 is a block diagram illustrating a functional configuration of the system controller 1. As illustrated in FIG. 2, the system controller 1 comprises an operation receiver 10, a display 11, a display data storage 12, a user I/F controller 13, a device control data storage 14, a device controller 15, an arbitrator 16, a first FIFO buffer 17, and a second FIFO buffer 18.

Functions such as the user I/F controller 13, the device controller 15, and the arbitrator 16 are realized by a CPU or the like executing one or more given programs stored in ROM or the like, under control by a given operating system (OS) installed in the system controller 1. In addition, the user I/F controller 13 and the device controller 15 are so-called tasks, and are alternately activated by the OS.

The operation receiver 10 receives input operations from a user. Data regarding input operations received by the operation receiver 10 (user operation data) is written to an operation interrupt buffer (not illustrated) by an operation interrupt handler (not illustrated). User operation data written to the operation interrupt buffer is loaded by the user I/F controller 13.

The display 11, under control by the user I/F controller 13, displays a screen for user operations, user's input results (that is, user operation data), user-desired data (data indicating the operating state of the devices 2, for example), and the like.

The display data storage 12 (first data storage means) stores data indicating the operating state of each device 2 (operating state data), and otherwise stores various data related to the above displays by the display 11.

The user I/F controller 13 (first control means) controls the above operation receiver 10 and the display 11, and performs general control related to the user interface in the system controller 1. When activated, the user I/F controller 13 first checks the operation interrupt buffer. In the case where the above user operation data is being stored in the operation interrupt buffer, the user I/F controller 13 reads out user operation data from the operation interrupt buffer, and conducts processing according to the content of such user operation data.

In this case, assuming, for example, that the user operation data relates to the operation of the devices 2, the user I/F controller 13 issues an update registration request for operating state data to the arbitrator 16 discussed later. As a result, in the case where a response comes back from the arbitrator 16 indicating that update registration is permitted, the user I/F controller 13 generates FIFO registration data (details to be discussed later) from that user operation data, and stores the FIFO registration data in the first FIFO buffer 17. In addition, the user I/F controller 13 saves the generated FIFO registration data in the display data storage 12 as operating state data.

Meanwhile, in the case where a response comes back from the arbitrator 16 indicating that update registration is denied, the user I/F controller 13 discards the user operation data read out from the operation interrupt buffer.

In the case where user operation data is not being stored in the operation interrupt buffer, the user I/F controller 13 queries the arbitrator 16 for the presence or absence of operating state data requiring update registration. In the case where a response comes back from the arbitrator 16 indicating that operating state data requiring update registration does exist, the user I/F controller 13 sequentially retrieves FIFO registration data from the second FIFO buffer 18, and saves the FIFO registration data in the display data storage 12 as operating state data. After the completion of FIFO registration data retrieval, the user I/F controller 13 clears the second FIFO buffer 18. In other words, the user I/F controller 13 deletes all FIFO registration data being stored in the second FIFO buffer 18.

The device control data storage 14 (second data storage means) stores operating state data for each device 2. Details will be discussed later, but the data structure of operating state data stored in the device control data storage 14 is the same as the data structure of operating state data stored in the display data storage 12.

The device controller 15 (second control means) receives the above state change data transmitted from a device 2, and saves the received state change data in the device control data storage 14 as the current operating state data for that device 2.

More specifically, if a communication interface not illustrated starts to receive state change data transmitted from a device 2, a receive interrupt handler (not illustrated) is activated. Then, the receive interrupt handler writes the state change data received via the communication interface to a receive interrupt buffer (not illustrated). When activated, the device controller 15 first checks the receive interrupt buffer. In the case where state change data is being stored in the receive interrupt buffer, the device controller 15 reads out the state change data from the receive interrupt buffer. The device controller 15 then issues an update registration request for operating state data to the arbitrator 16.

As a result, in the case where a response comes back from the arbitrator 16 indicating that update registration is permitted, the device controller 15 generates FIFO registration data (details to be discussed later) from the state change data, and stores the FIFO registration data in the second FIFO buffer 18. In addition, the device controller 15 saves the generated FIFO registration data in the device control data storage 14 as operating state data. Meanwhile, in the case where a response comes back from the arbitrator 16 indicating that update registration is denied, the device controller 15 discards the state change data read out from the receive interrupt buffer.

In the case where state change data is not being stored in the receive interrupt buffer, the device controller 15 queries the arbitrator 16 for the presence or absence of operating state data requiring update registration. In the case where a response comes back from the arbitrator 16 indicating that operating state data requiring update registration does exist, the device controller 15 sequentially retrieves FIFO registration data from the first FIFO buffer 17, and saves the FIFO registration data in the device control data storage 14 as operating state data. After the completion of FIFO registration data retrieval, the device controller 15 clears the first FIFO buffer 17. In other words, the device controller 15 deletes all FIFO registration data being stored in the first FIFO buffer 17. In addition, the device controller 15 generates device control data on the basis of the FIFO registration data retrieved from the first FIFO buffer 17, and transmits the generated device control data to a corresponding device 2.

As discussed above, upon receiving an update registration request for operating state data from the user I/F controller 13 or the device controller 15, the arbitrator 16 determines to either permit or deny the update registration of that operating state data, and responds to the requesting user I/F controller 13 or device controller 15 with the determination result. The arbitrator 16 makes the above determination on the basis of a data ID notified by the user I/F controller 13 or the device controller 15 at the time of an update registration request.

Figure 3:
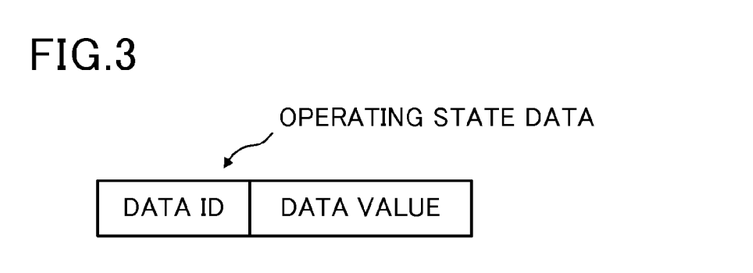
FIG. 3 is a diagram illustrating a data structure of operating state data in Embodiment 1.

The structure of operating state data in the present embodiment will now be described. As illustrated in FIG. 3, operating state data is made up of a data ID and a data value. The data ID is an ID assigned in advance in order to uniquely identify the instance level of each data item used in that system. More specifically, a data ID is given to every control/monitoring target for each device 2. For example, a data ID is given to each of "device 2A operating mode", "device 2B set temperature", "device 2C set airflow", and the like.

The data value is indicated as a predetermined value depending on the type of operating mode, such as Stop: 0, Cool: 1, Heat: 2, Fan: 3, and Dehumidify: 4 in the case where the content of the operating state indicates the operating mode, for example. Also, the data value indicates a temperature value (units: degrees Celsius) in the case where the content of the operating state indicates the set temperature.

Upon receiving an update registration request for operating state data from either the user I/F controller 13 or the device controller 15, the arbitrator 16 determines whether or not the other controller has already issued an update registration request for operating state data regarding the same data ID. In other words, the arbitrator 16 determines whether or not a race is occurring between update registration requests for operating state data regarding the same data ID. As a result, in the case where a race is not occurring, the arbitrator 16 returns a response indicating that update registration is permitted to the current requesting user I/F controller 13 or device controller 15. On the other hand, in the case where a race is occurring, the arbitrator 16 returns a response indicating that update registration is denied to the current request source. In other words, in the case where a race occurs, the update registration request issued earlier is given priority (that is, the first one wins).

In addition, upon receiving the above query for the presence or absence of operating state data requiring update registration from either the user I/F controller 13 or the device controller 15, the arbitrator 16 determines whether or not another already-permitted update registration request exists. In the case where another already-permitted update registration request exists, the arbitrator 16 returns a response indicating that operating state data requiring update registration exists to the querying user I/F controller 13 or device controller 15. On the other hand, in the case where another already-permitted update registration request does not exist, the arbitrator 16 returns a response indicating that operating state data requiring update registration does not exist to the query source.

The first FIFO buffer 17 is a buffer used to transfer operating state data requiring update registration from the user I/F controller 13 to the device controller 15. As discussed above, in the case where a response comes back from the arbitrator 16 indicating that update registration is permitted, the user I/F controller 13 stores FIFO registration data in the first FIFO buffer 17. Then, in the case where a response comes back from the arbitrator 16 indicating that operating state data requiring update registration exists, the device controller 15 retrieves the FIFO registration data from the first FIFO buffer 17. In the present embodiment, the data structure of FIFO registration data is the same as the data structure of operating state data (see FIG. 3).

The second FIFO buffer 18 is a buffer used to transfer operating state data requiring update registration from the device controller 15 to the user I/F controller 13. As discussed above, in the case where a response comes back from the arbitrator 16 indicating that update registration is permitted, the device controller 15 stores FIFO registration data in the second FIFO buffer 18. Then, in the case where a response comes back from the arbitrator 16 indicating that operating state data requiring update registration exists, the user I/F controller 13 retrieves the FIFO registration data from the second FIFO buffer 18.

Figure 4:
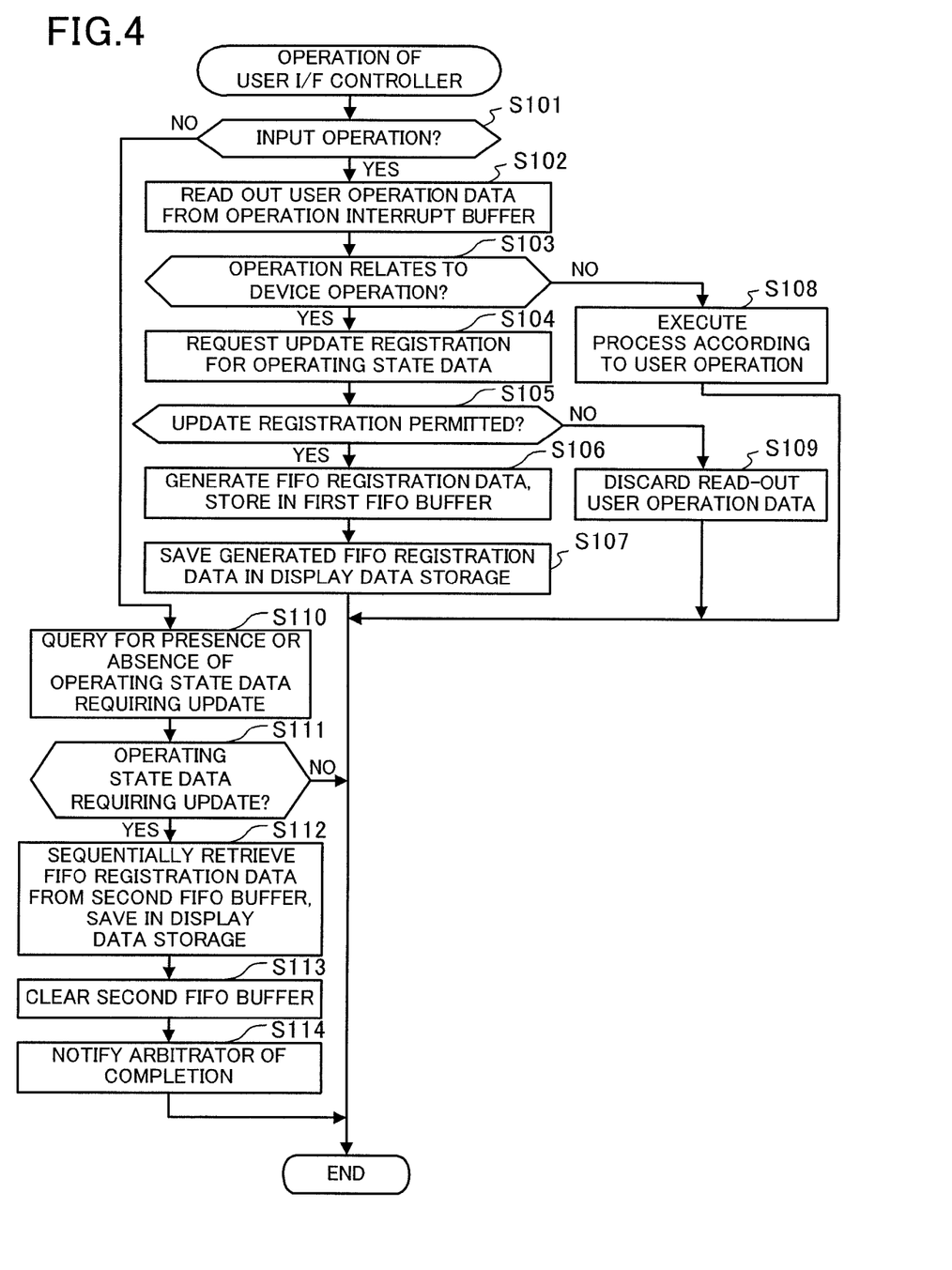
FIG. 4 is a flowchart illustrating an operating sequence of a user I/F controller in Embodiment 1.

FIG. 4 is a flowchart illustrating an operating sequence of the user I/F controller 13. When activated, the user I/F controller 13 checks the operation interrupt buffer. In the case where user operation data is being stored in the operation interrupt buffer, that is, in the case where a user has performed an input operation (step S101; Yes), the user I/F controller 13 reads out user operation data from the operation interrupt buffer (step S102).

In the case where the read-out user operation data relates to the operation of a device 2 (step S103; Yes), the user I/F controller 13 issues an update registration request for operating state data to the arbitrator 16 (step S104). On the other hand, in the case where the read-out user operation data does not relate to the operation of a device 2 (step S103; No), the user I/F controller 13 conducts a display or other user interface process according to the content of such user operation data (step S108).

After the update registration request, in the case where a response comes back from the arbitrator 16 indicating that update registration is permitted (step S105; Yes), the user I/F controller 13 generates FIFO registration data from the user operation data, and stores the FIFO registration data in the first FIFO buffer 17 (step S106). In addition, the user I/F controller 13 saves the generated FIFO registration data in the display data storage 12 as operating state data (step S107).

On the other hand, in the case where a response comes back from the arbitrator 16 indicating that update registration is denied (step S105; No), the user I/F controller 13 discards the user operation data read out from the operation interrupt buffer (step S109).

In the case where user operation data is not being stored in the operation interrupt buffer (step S101; No), the user I/F controller 13 queries the arbitrator 16 for the presence or absence of operating state data requiring update registration (step S110). In response, in the case where a response comes back from the arbitrator 16 indicating that operating state data requiring update registration exists (step S111; Yes), the user I/F controller 13 sequentially retrieves FIFO registration data from the second FIFO buffer 18, and saves the FIFO registration data in the display data storage 12 as operating state data (step S112).

After the completion of FIFO registration data retrieval, the user I/F controller 13 clears the second FIFO buffer 18 (step S113). In addition, the user I/F controller 13 notifies the arbitrator 16 of that update registration is complete for all operating state data requiring update registration that was transferred from the device controller 15 (step S114).

Such a notice means that all operating state data for which the device controller 15 requested update registration is reflected in the display data storage 12, and thus the arbitrator 16 deletes all update registration requests previously received from the device controller 15.

Figure 5:
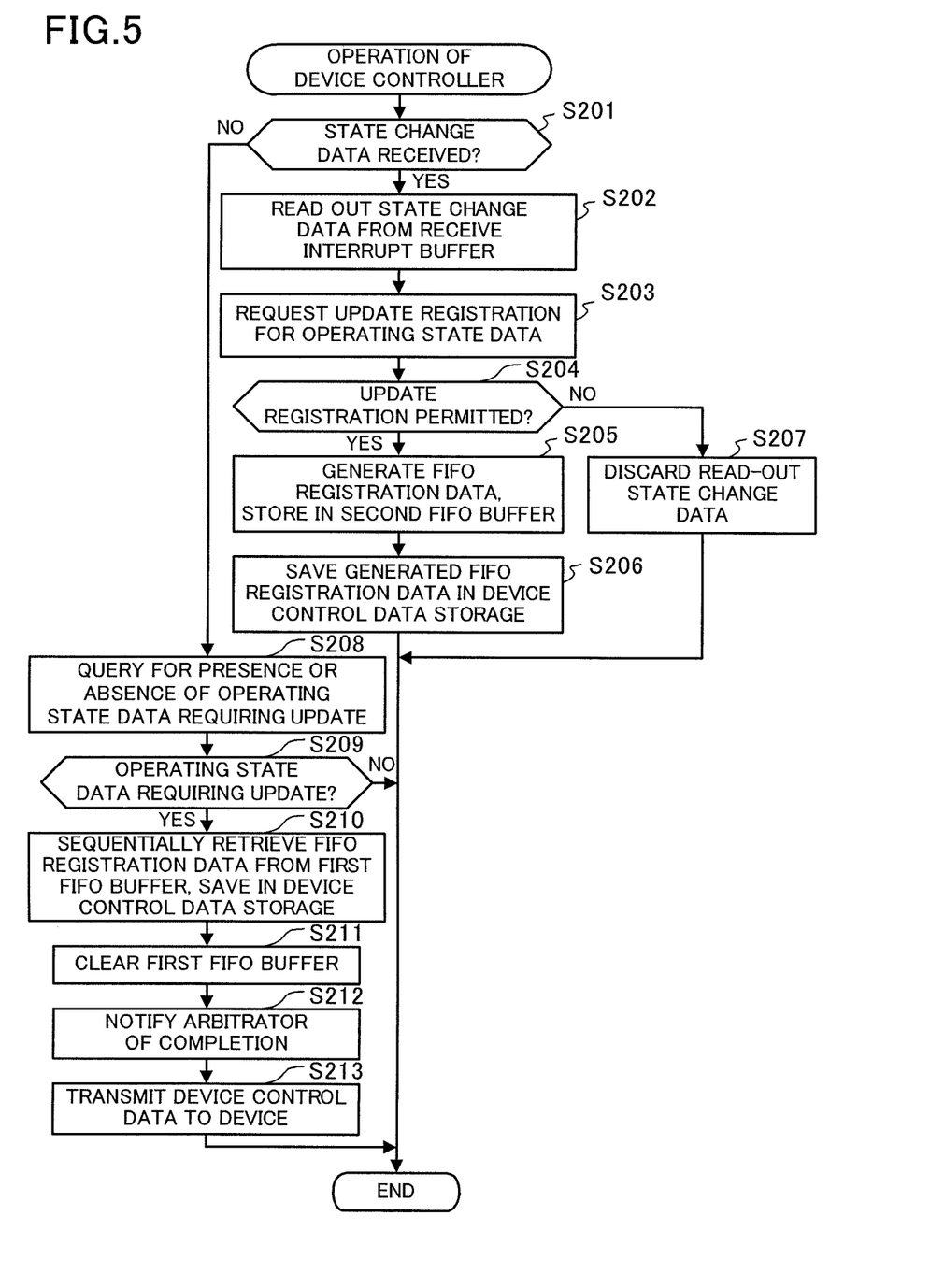
FIG. 5 is a flowchart illustrating an operating sequence of a device controller in Embodiment 1.

Next, an operating sequence of the device controller 15 will be described with reference to the flowchart in FIG. 5. When activated, the device controller 15 checks the receive interrupt buffer. In the case where state change data is being stored in the receive interrupt buffer, that is, in the case where state change data has been received from one of the devices 2 (step S201; Yes), the device controller 15 reads out the state change data from the receive interrupt buffer (step S202). The device controller 15 then issues an update registration request for operating state data to the arbitrator 16 (step S203).

After the update registration request, in the case where a response comes back from the arbitrator 16 indicating that update registration is permitted (step S204; Yes), the device controller 15 generates FIFO registration data from the state change data, and stores the FIFO registration data in the second FIFO buffer 18 (step S205). In addition, the device controller 15 saves the generated FIFO registration data in the device control data storage 14 as operating state data (step S206). On the other hand, in the case where a response comes back from the arbitrator 16 indicating that update registration is denied (step S204; No), the device controller 15 discards the state change data read out from the receive interrupt buffer (step S207).

In the case where state change data is not being stored in the receive interrupt buffer (step S201; No), the device controller 15 queries the arbitrator 16 for the presence or absence of operating state data requiring update registration (step S208). In response, in the case where a response comes back from the arbitrator 16 indicating that operating state data requiring update registration exists (step S209; Yes), the device controller 15 sequentially retrieves FIFO registration data from the first FIFO buffer 17, and saves the FIFO registration data in the device control data storage 14 as operating state data (step S210).

After the completion of FIFO registration data retrieval, the device controller 15 clears the first FIFO buffer 17 (step S211). In addition, the device controller 15 notifies the arbitrator 16 of that update registration is complete for all operating state data requiring update registration that was transferred from the user I/F controller 13 (step S212).

Such a notice means that all operating state data for which the user I/F controller 13 requested update registration is reflected in the device control data storage 14, and thus the arbitrator 16 deletes all update registration requests previously received from the user I/F controller 13.

The device controller 15 then generates device control data on the basis of the FIFO registration data retrieved from the first FIFO buffer 17, and transmits the device control data to the corresponding device 2 (step S213).

As described above, the system controller 1 in the present embodiment is equipped with an arbitrator 16 that, in respective processes by the user I/F controller 13 and the device controller 15, determines to permit or deny the update registration of operating state data for a given data ID in the case where a change is produced in the data value of the operating state data with that data ID. Thus, in the display data storage 12 and the device control data storage 14 managed by the user I/F controller 13 and the device controller 15, respectively, it is possible to update and synchronize operating state data, and maintain the consistency of the operating state data.

Also, since the above update synchronization is realized by a configuration that does not rely on OS functions, it becomes possible to avoid overhead and deadlocks occurring due to OS processes, such as issuing system calls, for example. Consequently, higher execution efficiency is anticipated.

Various configurations like the following are also implementable as modifications in the present embodiment.

For example, in the case where a race between update registration requests for operating state data occurs, the arbitrator 16 may compare priority levels respectively assigned to the user I/F controller 13 and the device controller 15 in advance, and prioritize the update registration request with the higher priority level.

Also, the technique of retrieving FIFO registration data from each of the first FIFO buffer 17 and the second FIFO buffer 18 is not limited to the above embodiment. In other words, the user I/F controller 13 (device controller 15) is not necessarily required to retrieve all FIFO registration data from the second FIFO buffer 18 (first FIFO buffer 17) in one process at the time of activation. For example, the user I/F controller 13 (device controller 15) may retrieve FIFO registration data one at a time from the second FIFO buffer 18 (first FIFO buffer 17), or retrieve FIFO registration data with a predetermined number set as a limit. In this case, the user 1/F controller 13 (device controller 15) clears only the area from which relevant FIFO registration data was retrieved in the second FIFO buffer 18 (first FIFO buffer 17). In other words, the user I/F controller 13 (device controller 15) deletes only the relevant FIFO registration data from the second FIFO buffer 18 (first FIFO buffer 17).

Additionally, the user I/F controller 13 (device controller 15) notifies the arbitrator 16 of each data ID of one or more FIFO registration data items whose retrieval is complete. Upon receiving such a notice, the arbitrator 16 deletes the update registration requests corresponding to that data ID that were previously received from the other controller (task).

(Embodiment 2)

Next, a system controller according to Embodiment 2 of the present invention will be described. The system controller 1 in Embodiment 1 is configured to update and synchronize operating state data in data storages (the display data storage 12 and the device control data storage 14) respectively managed by two controllers (the user I/F controller 13 and the device controller 15). The system controller in the present embodiment is configured to update and synchronize operating state data in data storages respectively managed by three controllers.

Figure 6:
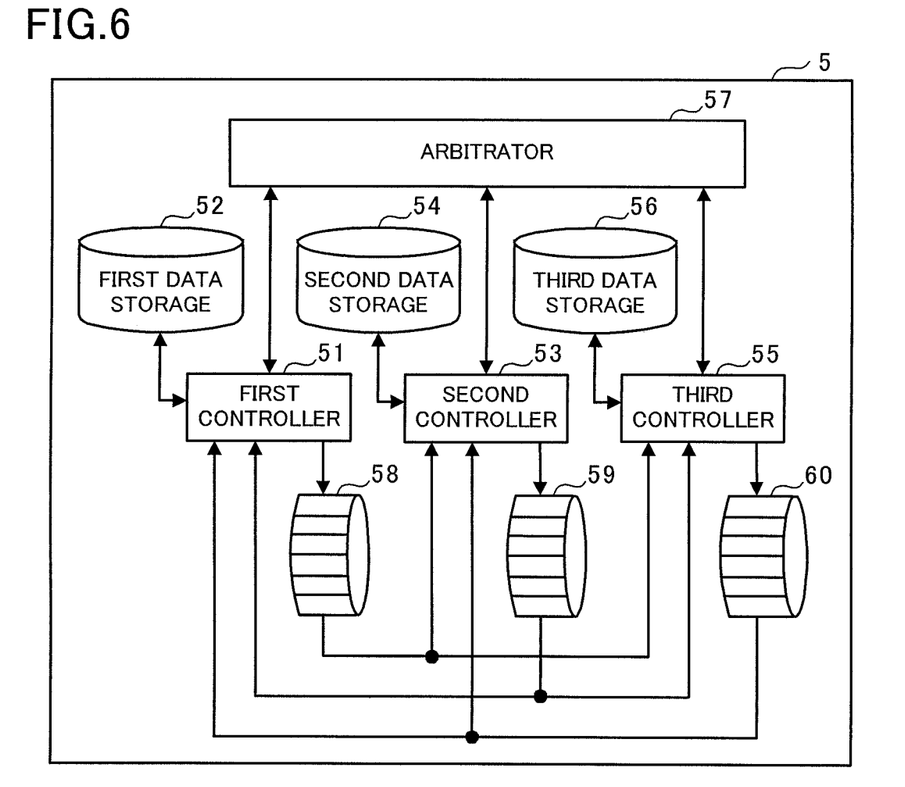
FIG. 6 is a block diagram illustrating a functional configuration of a system controller in Embodiment 2.

FIG. 6 is a block diagram schematically illustrating a functional configuration of a system controller 5 in the present embodiment. Note that the system controller 5 likewise assumes a facility system like that is illustrated in FIG. 1, similarly to the system controller 1 in Embodiment 1.

As illustrated in FIG. 6, the system controller 5 comprises a first controller 51, a first data storage 52, a second controller 53, a second data storage 54, a third controller 55, a third data storage 56, an arbitrator 57, a first FIFO buffer 58, a second FIFO buffer 59, and a third FIFO buffer 60.

The first controller 51, the second controller 53, and the third controller 55 are so-called tasks, with their successive activation switched in a given order by the OS.

One of the controllers from among the first controller 51, the second controller 53, and the third controller 55 performs general control related to the user interface in the system controller 5, similarly to the user I/F controller 13 in the system controller 1 in Embodiment 1. Another of the controllers conducts processes related to the devices 2, similarly to the device controller 15 in the system controller 1 in Embodiment 1.

The first controller 51 accesses the first data storage 52 to read and write various data, including operating state data. The second controller 53 accesses the second data storage 54 to read and write various data, including operating state data. The third controller 55 accesses the third data storage 56 to read and write various data, including operating state data.

Upon receiving an update registration request for operating state data from the first controller 51, the second controller 53, or the third controller 55, the arbitrator 57 determines whether to permit or deny update registration of that operating state data, and responds to the request source with the determination result, similarly to the arbitrator 16 in the system controller 1 in Embodiment 1. In addition, upon receiving a query for the presence or absence of operating state data requiring update registration from the first controller 51, the second controller 53, or the third controller 55, the arbitrator 57 determines whether or not another already-permitted update registration request exists.

In the case where another already-permitted update registration request exists, the arbitrator 57 returns a response to the query source indicating that operating state data requiring update registration exists. On the other hand, in the case where another already-permitted update registration request does not exist, the arbitrator 57 returns a response to the query source indicating that operating state data requiring update registration does not exist.

The first FIFO buffer 58 is a buffer used to transfer operating state data requiring update registration from the first controller 51 to the second controller 53 and the third controller 55. The second FIFO buffer 59 is a buffer used to transfer operating state data requiring update registration from the second controller 53 to the first controller 51 and the third controller 55. The third FIFO buffer 60 is a buffer used to transfer operating state data requiring update registration from the third controller 55 to the first controller 51 and the second controller 53.

Figure 7:
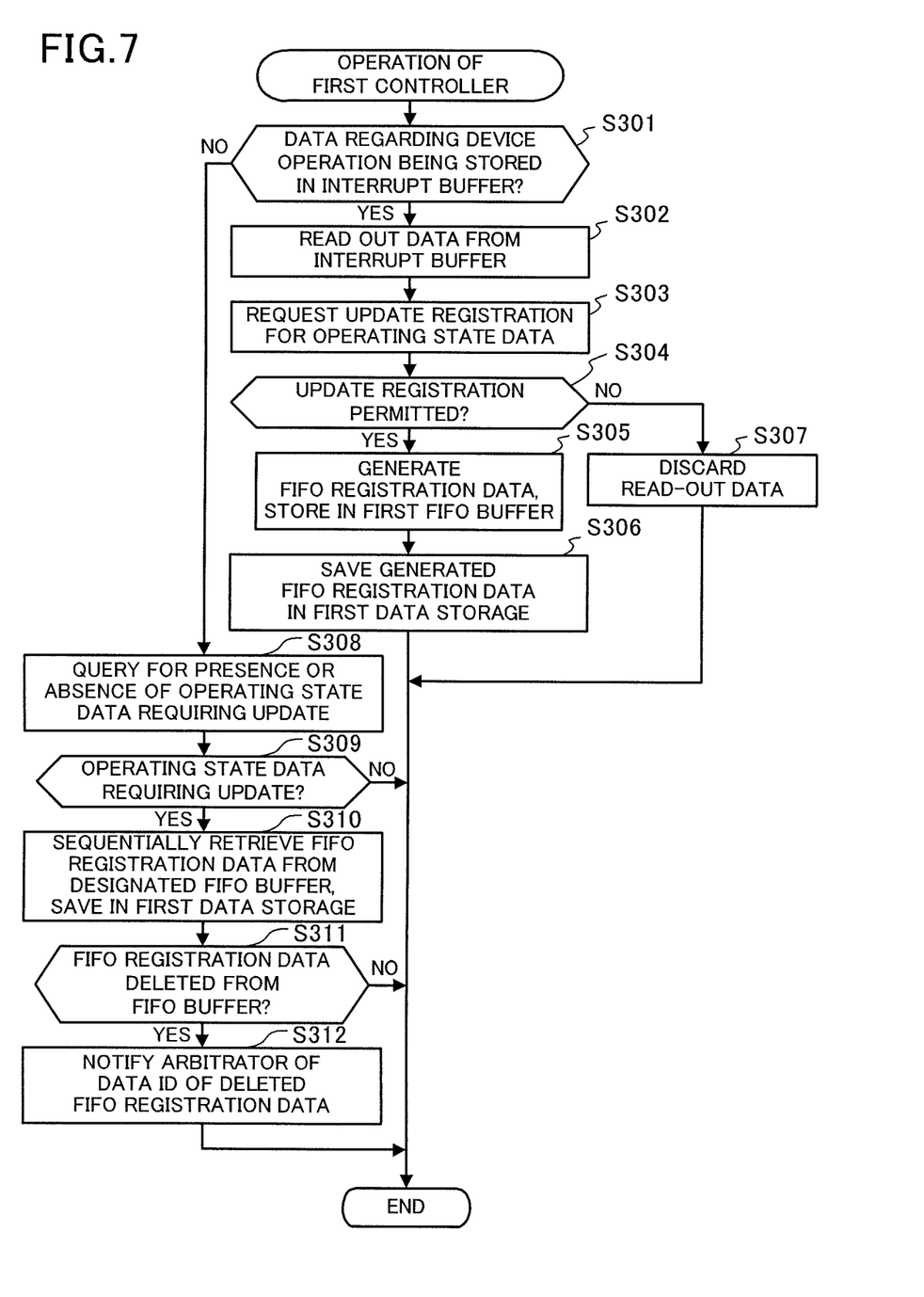
FIG. 7 is a flowchart illustrating an operating sequence of a first controller in Embodiment 2.

The flowchart in FIG. 7 will be referenced to describe an operating sequence for each task (first controller 51, second controller 53, third controller 55) in the system controller 5 with the above configuration. Note that in the following operating sequence, only the operation common to each task will be described, in order to ease understanding of the functions characteristic to the system controller 5 in the present embodiment. The operation common to each task will be described by taking the operation of the first controller 51 as an example.

First, the first controller 51 checks an interrupt buffer (not illustrated) that the first controller 51 itself manages. In the case where data regarding the operation of a device 2 is being stored in the interrupt buffer (step S301; Yes), the first controller 51 reads out the data from that interrupt buffer (step S302). The first controller 51 then issues an update registration request for operating state data to the arbitrator 57 (step S303). At this point, the first controller 51 notifies the arbitrator 57 of a task ID and a data ID. The task ID is an ID assigned in advance in order to uniquely identify each task, that is, each controller (first controller 51, second controller 53, third controller 55).

Upon receiving such an update registration request, the arbitrator 57 determines whether or not an update registration request for operating state data regarding the same data ID has been issued already from another task (in this case, the second controller 53 or the third controller 55). In other words, the arbitrator 57 determines whether or not a race is occurring between update registration requests for operating state data regarding the same data ID.

Figure 8:
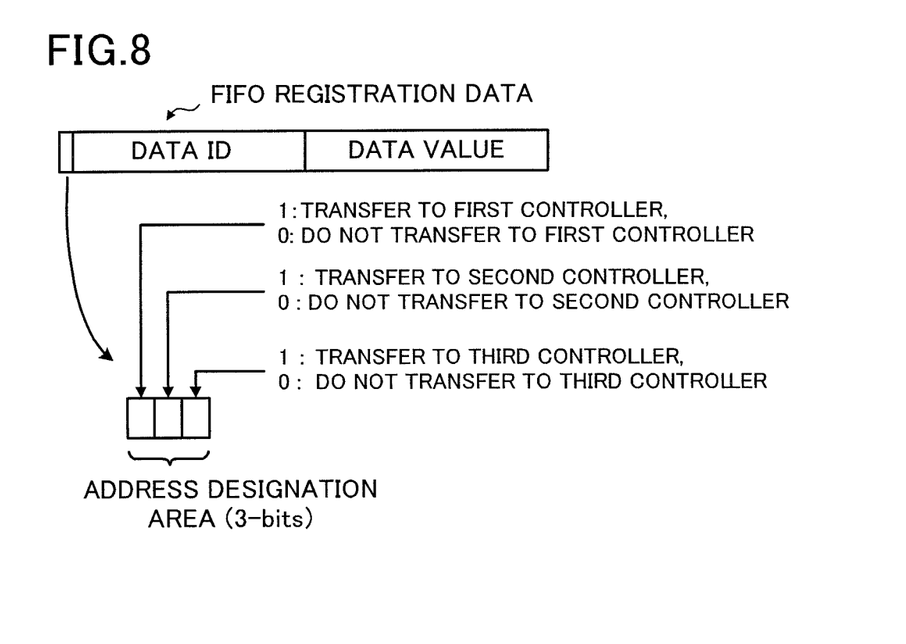
FIG. 8 is a diagram illustrating a data structure of FIFO registration data in Embodiment 2.

As a result, in the case where a response comes back from the arbitrator 57 indicating that update registration is permitted (step S304; Yes), the first controller 51 generates FIFO registration data on the basis of data read out from the interrupt buffer, and stores the FIFO registration data in the first FIFO buffer 58 (step S305). The data structure of FIFO registration data in the present embodiment will now be described. As illustrated in FIG. 8, FIFO registration data in the present embodiment is made up of a data ID and a data value, similarly to FIFO registration data in Embodiment 1. However, the FIFO registration data differs from the case in Embodiment 1 in that the most significant bits of the data ID (herein, 3 bits) are used as an address (transfer destination) designation area.

In this example, one bit each in order starting from the most significant bit is used for address designation of the first controller 51, the second controller 53, and the third controller 55. By raising the bit corresponding to a given task (first controller 51, second controller 53, or third controller 55) in the address designation area, it is possible to designate that task as the transfer destination for FIFO registration data (in other words, operating state data).

Figure 9A:
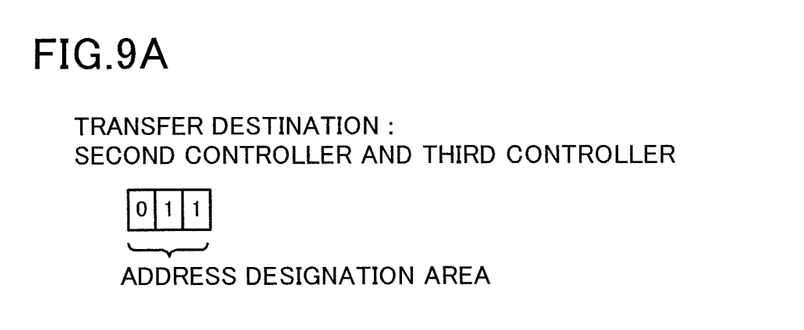
FIG. 9A is a diagram (part 1) for explaining the setting of an address designation in Embodiment 2.
Figure 9B:
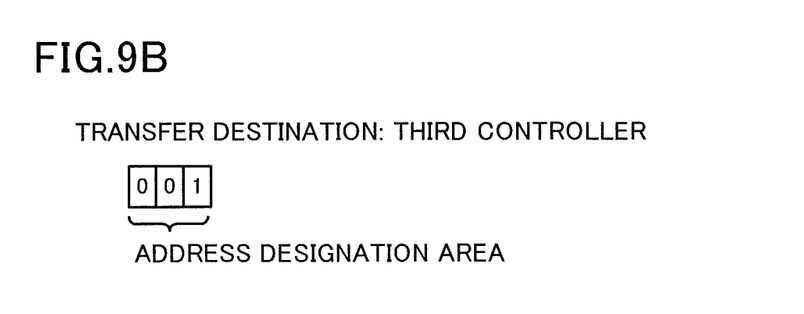
FIG. 9B is a diagram (part 2) for explaining the setting of an address designation in Embodiment 2.

For example, in the case of wanting to transfer FIFO registration data to the second controller 53 and the third controller 55, the first controller 51 sets the address designation area as illustrated in FIG. 9A. As another example, in the case where updating and synchronizing operating state data for a given data ID between the first controller 51 and the third controller 55 is sufficient, the first controller 51 sets the address designation area as illustrated in FIG. 9B.

Returning to the flow in FIG. 7, the first controller 51 saves the generated FIFO registration data in the first data storage 52 as operating state data (step S306). On the other hand, in the case where a response comes back from the arbitrator 57 indicating that update registration is denied (step S304; No), the first controller 51 discards the data read out from the interrupt buffer (step S307).

In the case where data regarding the operation of a device 2 is not being stored in the interrupt buffer (step S301; No), the first controller 51 queries the arbitrator 57 for the presence or absence of operating state data requiring update registration (step S308).

Upon receiving a query for the presence or absence of operating state data requiring update registration, the arbitrator 57 determines whether or not an already-permitted update registration request from another task (in this case, the second controller 53 or the third controller 55) exists. In the case where another already-permitted update registration request exists, the arbitrator 57 returns a response to the first controller 51 indicating that operating state data requiring update registration exists. At this point, the arbitrator 57 notifies the first controller 51 of information indicating the FIFO buffer where the operating state data requiring update registration (that is, the FIFO registration data) is stored. In this case, a pointer or the like indicating the start address of the relevant FIFO buffer is notified, for example.

On the other hand, in the case where another already-permitted update registration request does not exist, the arbitrator 57 returns a response to the first controller 51 indicating that operating state data requiring update registration does not exist.

In the case where a response comes back from the arbitrator 57 indicating that operating state data requiring update registration exists (step S309; Yes), the first controller 51 sequentially retrieves FIFO registration data from the notified FIFO buffer (in this case, either the second FIFO buffer 59 or the third FIFO buffer 60), and saves the FIFO registration data in the first data storage 52 as operating state data (step S310).

Figure 10A:
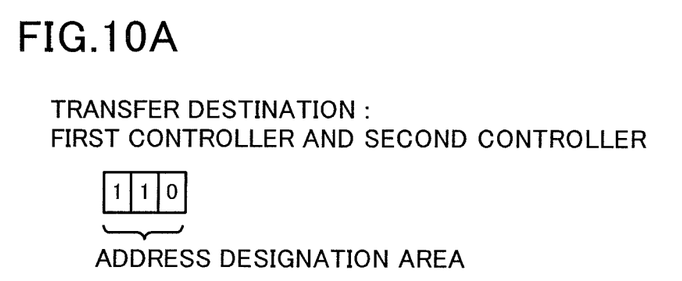
FIG. 10A is a diagram (part 1) for explaining the canceling of an address designation in Embodiment 2.
Figure 10B:
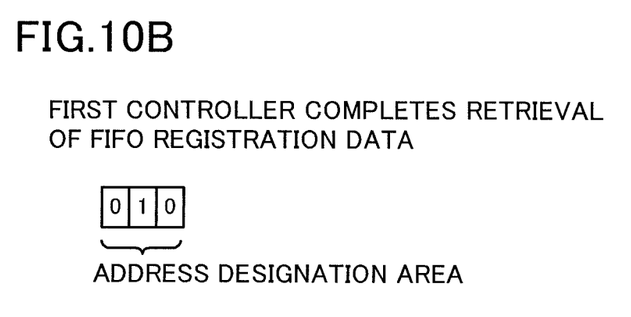
FIG. 10B is a diagram (part 2) for explaining the canceling of an address designation in Embodiment 2.

In the above, the first controller 51 lowers the bit corresponding to its own task (in this case, the most significant bit) in the address designation area of the retrieved FIFO registration data (sets the bit to 0), and then conducts a process that once again writes the original FIFO buffer storage location. In other words, the first controller 51 conducts a process that cancels address designation directed to the first controller 51 itself. For example, in the case where the address designation area of the retrieved FIFO registration data is set as illustrated in FIG. 10A, the first controller 51 changes the address designation area setting as illustrated in FIG. 10B. Thus, the FIFO registration data indicates that the first controller 51 has completed retrieval.

Note that in the case where all bits constituting the address designation area are put in a lowered state (set to 0) as a result of the first controller 51 lowering a bit, the first controller 51 deletes that FIFO registration data from the corresponding FIFO buffer.

Also, in the case where operating state data requiring update registration is being stored in both the second FIFO buffer 59 and the third FIFO buffer 60, the arbitrator 57 notifies the first controller 51 of this state. The first controller 51 then sequentially retrieves FIFO registration data from both the second FIFO buffer 59 and the third FIFO buffer 60, and saves the FIFO registration data in the first data storage 52 as operating state data.

In the case where, when retrieving FIFO registration data, that FIFO registration data has been deleted from the FIFO buffer (step S311; Yes), the first controller 51 notifies the arbitrator 57 of the data ID of the deleted FIFO registration data (step S312).

Upon receiving the above notice from the first controller 51, the arbitrator 57 deletes update registration requests corresponding to that data ID from other controllers (tasks).

In this way, in the system controller 5 in the present embodiment, it is possible to update and synchronize operating state data in data storages (databases) respectively managed by three controllers (tasks). Furthermore, if the bit width of the address designation area is expanded, it is possible to easily support configurations with four or more pairs of controllers and data storages, according to logic similar to the above.

Note that in the case where a race occurs between update registration requests for operating state data, the arbitrator 57 may compare priority levels respectively assigned to the first controller 51, the second controller 53, and the third controller 55, and prioritize the update registration request with the higher priority level.

In addition, by applying programs respectively executed by the foregoing system controller 1 in Embodiment 1 and system controller 5 in Embodiment 2 to an existing personal computer (PC) or the like, it is possible to cause such a PC to function as a system controller in accordance with the present invention.

The method of distributing such programs is arbitrary. For example, it is possible for programs to be stored and distributed on a computer-readable recording medium such as a Compact Disk Read-Only Memory (CD-ROM), a Digital Versatile Disk (DVD), a Magneto Optical disk (MO), a memory card, and/or the like, or distributed via a communication network such as the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

INDUSTRIAL APPLICABILITY

The present invention may be suitably implemented in a system for controlling and managing devices such as air conditioners and lighting device installed in a building or the like.

REFERENCE SIGNS LIST

1 System controller (Embodiment 1)
10 Operation receiver
11 Display
12 Display data storage
13 User I/F controller
14 Device control data storage
15 Device controller
16 Arbitrator
17 First FIFO buffer
18 Second FIFO buffer
2A, 2B, 2C Device
3 Remote control
4 Facility network
5 System controller (Embodiment 2)
51 First controller
52 First data storage
53 Second controller
54 Second data storage
55 Third controller
56 Third data storage
57 Arbitrator
58 First FIFO buffer
59 Second FIFO buffer
60 Third FIFO buffer

The invention claimed is:

1. A system controller comprising:
   a first controller that conducts a process related to a user interface;
   a second controller that exchanges data with a device;
   a first data storage that stores operating state data regarding the operating state of the device, and is subjected to data reading and writing by the first controller;
   a second data storage that stores the operating state data, and is subjected to data reading and writing by the second controller; and
   an arbitrator that, when receiving an update registration request for operating state data from the first controller or the second controller, determines whether to permit or deny update registration for the operating state data according to given conditions, and responds to the request source with a determined result, while also retaining the update registration request for operating state data in the case of permission;
   wherein, in the case where the first controller or the second controller issues an update registration request for operating state data and the update registration is permitted by the arbitrator, the first controller or the second controller stores update data indicating updated content for the operating state data in a given buffer, while also updating the content of the operating state data being saved in the corresponding first data storage or second data storage on the basis of the update data, and
   in the case where the arbitrator is retaining an update registration request from the other controller, the first controller or the second controller retrieves update data stored by the other controller from the buffer, and updates the content of the operating state data being saved in the corresponding first data storage or second data storage on the basis of the update data.

2. The system controller according to claim 1, wherein the buffer is made up of
   a first buffer to which the update data is written by the first controller, and from which the update data is retrieved by the second controller, and
   a second buffer to which the update data is written by the second controller, and from which the update data is retrieved by the first controller.

3. The system controller according to claim 1, wherein
   when the arbitrator receives the update registration request for operating state data from the first controller or the second controller, the arbitrator permits the update registration in the case where the arbitrator is not retaining an update registration request from the other controller for operating state data having a given instance level that matches the operating state data.

4. The system controller according to claim 1, wherein
   the first controller and the second controller are each given a priority level in advance that indicates each other's relative priority, and
   when the arbitrator receives the update registration request for operating state data from the first controller or the second controller, if the arbitrator is retaining an update registration request from the other controller for operating state data having a given instance level that matches the operating state data, the arbitrator permits the update registration in the case where the controller that issued the update registration has the higher priority level.

5. The system controller according to claim 1, further comprising:
   a third controller that conducts a process different from the first controller and the second controller; and
   a third data storage that stores operating state data regarding the operating state of the device, and is subjected to data reading and writing by the third controller;
   wherein, when receiving the update registration request for operating state data from the third controller, the arbitrator additionally determines whether to permit or deny update registration for the operating state data according to given conditions, and responds to the third controller with a determined result, while also retaining the update registration request for operating state data in the case of permission, in the case where the first controller, the second controller, or the third controller issues the update registration request for operating state data and the update registration is permitted by the arbitrator, the first controller, the second controller, or the third controller stores update data indicating updated content for the operating state data in a given buffer, while also updating the content of the operating state data being saved in the corresponding first data storage, second data storage, or third data storage on the basis of the update data, and in the case where the arbitrator is retaining an update registration request from another controller, the first controller, the second controller, or the third controller retrieves update data stored by the other controller from the buffer, and updates the content of the operating state data being saved in the corresponding first data storage, second data storage, or third data storage on the basis of the update data.

6. The system controller according to claim 5, wherein the buffer is made up of
a first buffer to which the update data is written by the first controller, and from which the update data is retrieved by the second controller or the third controller,
a second buffer to which the update data is written by the second controller, and from which the update data is retrieved by the first controller or the third controller, and
a third buffer to which the update data is written by the third controller, and from which the update data is retrieved by the first controller or the second controller.

7. The system controller according to claim 5, wherein provided in the update data is an area where the first controller, the second controller, or the third controller designates another controller to retrieve the update data.

8. A non-transitory computer-readable recording medium having stored thereof a program causing a computer to function as:
a first controller that conducts a process related to a user interface;
a second controller that exchanges data with a device;
a first data storage that stores operating state data regarding the operating state of the device, and is subjected to data reading and writing by the first controller;
a second data storage that stores the operating state data, and is subjected to data reading and writing by the second controller; and
an arbitrator that, when receiving an update registration request for operating state data from the first controller or the second controller, determines whether to permit or deny update registration for the operating state data according to given conditions, and responds to the request source with a determined result, while also retaining the update registration request for operating state data in the case of permission;
wherein, in the case where the first controller or the second controller issues an update registration request for operating state data and the update registration is permitted by the arbitrator, the first controller or the second controller stores update data indicating updated content for the operating state data in a given buffer, while also updating the content of the operating state data being saved in the corresponding first data storage or second data storage on the basis of the update data, and
in the case where the arbitrator is retaining an update registration request from the other controller, the first controller or the second controller retrieves update data stored by the other controller from the buffer, and updates the content of the operating state data being saved in the corresponding first data storage or second data storage on the basis of the update data.

9. A facility system comprising:
the system controller of claim 1; and
one or more devices.

* * * * *